(12) United States Patent
Halvarsson

(10) Patent No.: US 12,034,828 B2
(45) Date of Patent: Jul. 9, 2024

(54) SYSTEM, DEVICE AND A METHOD FOR PROVIDING AN IMPROVED WiFi™ AUDIO SYSTEM

(71) Applicant: StiDev AB, Lomma (SE)

(72) Inventor: Stig Halvarsson, Lomma (SE)

( * ) Notice: Subject to any disclaimer, the term of this patent is extended or adjusted under 35 U.S.C. 154(b) by 0 days.

(21) Appl. No.: 17/905,463

(22) PCT Filed: Apr. 27, 2021

(86) PCT No.: PCT/IB2021/053451
§ 371 (c)(1),
(2) Date: Sep. 1, 2022

(87) PCT Pub. No.: WO2021/220149
PCT Pub. Date: Nov. 4, 2021

(65) Prior Publication Data
US 2023/0124746 A1 Apr. 20, 2023

(30) Foreign Application Priority Data

Apr. 28, 2020 (SE) .................................... 2030143-8

(51) Int. Cl.
*H04L 7/08* (2006.01)
*H04L 7/00* (2006.01)
(Continued)

(52) U.S. Cl.
CPC ............ *H04L 7/0008* (2013.01); *H04R 5/04* (2013.01); *H04R 27/00* (2013.01); *H04R 2227/005* (2013.01); *H04R 2420/07* (2013.01)

(58) Field of Classification Search
CPC ......... H04L 7/0008; H04R 5/04; H04R 27/00; H04R 2420/07
See application file for complete search history.

(56) References Cited

U.S. PATENT DOCUMENTS

| 7,477,890 B1* | 1/2009 | Narayanaswami | ... H04W 12/33 455/418 |
| 2007/0110074 A1* | 5/2007 | Bradley | ............. H04N 21/8547 370/395.51 |

(Continued)

OTHER PUBLICATIONS

Notification Concerning Transmittal of International Preliminary Report on Patentability issued in International Patent Application PCT/IB2021/053451, on Nov. 10, 2022, 10 pages.

(Continued)

*Primary Examiner* — Jaison Joseph
(74) *Attorney, Agent, or Firm* — RC Trademark Company

(57) ABSTRACT

According to one aspect there is provided an audio system 10 comprising a transmission unit 100 and a plurality of speaker units 110-1, 110-2, 10-N, wherein the transmission unit 100 comprises a controller 101 and a wireless communication interface 103 arranged for communication according to an IEEE 802.11 standard (WiFi™), wherein the controller 101 is configured to: receive an audio data package to be played back; and to transmit the audio data package to be played back over the wireless communication interface 103 utilizing the same protocol for the transmission of the audio data package and for synchronizing the playback of the audio data, and wherein each of plurality of the speaker units 110-1, 110-2, 10-N comprises a controller 111, a PCM 111-1, a speaker element 114 and a wireless communication interface 113 arranged for communication according to an IEEE 802.11 standard (WiFi™), wherein the controller 111 is configured to: receive the at least one data package to be played back through the wireless communication interface 113 and to cause audio represented by the received audio data package to be played back through the speaker element 114 by feeding the audio data to the PCM 111-1 being connected to the speaker element 114.

20 Claims, 6 Drawing Sheets

(51) Int. Cl.
*H04R 5/04* (2006.01)
*H04R 27/00* (2006.01)

(56) References Cited

U.S. PATENT DOCUMENTS

| | | | | |
|---|---|---|---|---|
| 2009/0298420 | A1* | 12/2009 | Haartsen | H04J 3/0658 |
| | | | | 455/3.06 |
| 2011/0270428 | A1 | 11/2011 | Tam | |
| 2012/0087503 | A1 | 4/2012 | Watson et al. | |
| 2015/0319556 | A1* | 11/2015 | Chen | H04L 65/70 |
| | | | | 455/41.3 |
| 2019/0208323 | A1* | 7/2019 | Yazawa | H04S 7/00 |
| 2023/0124746 | A1* | 4/2023 | Halvarsson | H04L 7/0008 |
| | | | | 375/354 |

OTHER PUBLICATIONS

Notification of Transmittal of the International Search Report and the Written Opinion of the International Searching Authority issued in International Patent Application PCT/IB2021/053451, on Aug. 2, 2021, 13 pages.
Swedish Search Report issued in SE Patent Application No. 2030143-8, on Dec. 18, 2020, 09 pages.
Berra, et al. published "Issues in networking and data management of distributed multimedia systems", in Proceedings of the First International Symposium on High-Performance Distributed Computing. (HPDC-1), 1992, 12 pages.

* cited by examiner

SYSTEM, DEVICE AND A METHOD FOR PROVIDING AN IMPROVED WiFi™ AUDIO SYSTEM

TECHNICAL FIELD

The present invention relates to a system, a device and a method for providing for providing a wireless audio system.

BACKGROUND

Wireless speakers have been around for a number of years. Larry Schotz applied for a patent for a digital wireless speaker system as far back as 1994. Wireless speaker technology is simple in principle. Simply put, a transmitter sends a radio frequency signal to a receiver that's housed in a loudspeaker, a speaker unit. The speaker unit (which needs to be powered by an onboard amplifier) then plays the music or other audio comprised in the radio signal. Early day systems were designed around an analog system, functioning basically in the same manner as an FM-radio, where a modulated RF signal is broadcasted and received by the speaker units, amplified and played back through the speaker element(s) of the speaker unit. These early-day systems suffered from the problem that Radio Frequency signals can experience problems with signal errors caused by factors such as a low strength signal, limited number of channels, environmental noise or a blocked antenna. With wired speakers this may be corrected by boosting the signal which is a solution that also can only be applied to wireless speaker systems in a limited degree as various agencies, such as the Federal Communications Commission (FCC), limits the strength of the signals used in consumer electronics.

This lead to the solution of using digital signals, being transmitted over RF technologies, such as Bluetooth®, where the audio (and other) data is split up into packages that are transmitted over channels (wavelength channels). As the data packages carry checksums and are coded in specific error handling manners, such digital signals are less prone to errors and interferences. The first Bluetooth® driven wireless speakers were released at the start of the millennia.

FIG. 1A shows a schematic view of a wireless audio system 10. As discussed above, wireless audio systems are basically one or more loudspeakers which receive digital audio signals using radio frequency (RF) waves rather than over audio cables. Such an audio system 10 typically comprises a transmitter unit that is implemented as a Radio Frequency (RF) transmitter and will hereafter be referred to as a transmitter unit 100. Most commonly the transmitter unit 100 is arranged to operate according to a WiFi® (IEEE802.11) standard or a Bluetooth® standard, but variants using other RF techniques or standards also exist and/or are possible.

The transmitter unit 100 is arranged to receive audio data from an audio source 105. The audio source may be any audio providing device, such as a television set, a computer, a music player, a radio, a game station and so on. The exact nature of the media source is not essential, only that it provides audio data representing audio to be played through the audio system 10. The music source may even be comprised within the transmitter unit 100.

As stated above, the transmitter unit 100 is a RF transmitter and comprises an RF communications interface 103. The transmitter unit 100 is configured to receive audio data and forward at least a portion of the audio data to one or more speaker units 110-1, 110-2 . . . 110-N. In the example of FIG. 1A, there are three speaker units illustrated, but it should be noted that any number of speaker units is possible. Each speaker unit 110 has a wireless communication interface 113 through which the audio data is received, and a controller 111 that is configured to transform the audio data into audio that is played through one or more speaker elements 114. The speaker unit also comprises a memory 112 on which audio data may be stored or buffered, and which memory 112 also stores computer readable instructions for enabling the controller 111 to control the operation of the speaker unit 110.

The inventor has realized and identified a number of problems that exist in such audio systems of contemporary design. When discussing the problems and the solution to them, the description will focus on the audio being music, but it should be noted that the problems are relevant to all kinds of audio including music, voice, and film audio.

One problem lies in that even if digital signals are better at overcoming or coping with disturbing signals, such as environmental noise, low quality (or strength) of received signals and blocked antennas, the digital signals still suffer—as the inventor has realized after inventive and insightful reasoning—from the same basic problem as the early-day systems. Namely, that as more and more wireless devices communicating over the same type of Radio Access technology (RAT, such as Wifi™) become present in the vicinity of the audio system, the data traffic on the RF channels, used by the RAT, will become congested. This is basically the same problem as in analogue systems, where one RF signal interferes with another RF signal, but for the digital signals, the signals block each other from the data channels. The solution taken for the early-day system is not available to the digital systems, as they are already digital. There is thus a need for an audio system that ensures or at least increases the likelihood that all data packages are delivered in a timely manner, i.e. before they are needed for the playback to ensure a smooth playback experience without interruptions.

One proposed solution is to transmit the data packages comprising the audio data ahead of time so that a buffer is generated in the memory 112 of the speaker unit 110. However, this is not a complete solution as the buffer in practical applications has a limited size and also leads to a delay in startup of the playback. There is thus a need for an improved transmission of audio data in wireless audio systems.

Another problem lies in that as music constitutes a powerful, emotional and artistic experience, it is of the highest priority that timing of the audio is accurate or proper. To play a sound with proper timing means two different things. One is the delay of the sound from the transmitter to a speaker, usually named latency. The other is the time difference when a sound is being played compared to other speakers, this is usually named synchronization.

FIG. 1B shows a schematic view of an audio system 10 as in FIG. 1A, where the timing of the different speaker units 110 is indicated by the speaker units 110 being at different (horizontal) distances from the master server 100. The horizontal distances are used to indicate different latencies for the audio being transmitted from the master server 100 to each speaker unit 110. The need for synchronization is indicated by the dotted lines and referenced s in FIG. 1B.

Latency is important when listening to something that is also presented elsewhere, like the sound from a TV. Bad lip-sync can be very disturbing. Synchronization is important for how we experience the sound. Small differences can make us confused from where the sound is coming and larger synchronization errors makes it sound more as an echo.

It is thus of the highest priority that the different speaker units 110-1, 110-2, 110-N are all synchronized to one another. Even a slight difference in playback timing between two speakers may have detrimental effects to the listening experience. This is also a drawback associated with the buffer solution discussed above.

The accuracy needed for latency and synchronization are very different. Latency accuracy to accomplish lip-sync is in the range of 10th of milliseconds, or even more depending on who you ask. Synchronization on the other hand need to be far less than 100 microseconds, rather less than 10 microseconds. The factor between the two requirements are in other words about 1000 times. As reference, a single sample on a normal CD is about 23 microsecond (44.1 KHz sample rate) and the sound travels about 3.4 cm in 100 microsecond. Worth mentioning is that depending on where the audio source is coming from, it is often beneficial if the latency is low. For instance, if the audio is taken from the output of a TV which has already processed the video content, it is usually a limit of how much audio latency can be compensated for. If the latency for transferring audio from the TV to the speakers is too long it will be impossible to acquire lip-sync.

One problem in synchronizing two or more devices to one another is that it takes time to transport the synchronization information, such as when one device asks another device what the time the second device is on. This transport time will affect the accuracy of the synchronized time. For instance, if a device already knowing the accurate time sends a packet over a communication channel to another device indicating a current time, this indication of a current time is not correct when it is received if the time it took to send the packet is unknown. One way to overcome this timing problem for Ethernet and packet-based wireless communications is to use NTP (Network Time Protocol). This is a standard protocol for exchanging time information and can normally achieve time accuracy in the range of tens of millisecond. However, tens of milliseconds may not be sufficient when synchronizing musical devices as otherwise echo effects for example may occur. If better accuracy is needed there is another standard protocol to available, PTP (Precision Time Protocol). By using this in a wired computer network an accuracy of microseconds or even less can be achieved. One problem with this solution is that when used in a wireless network the accuracy is still not enough and can sometimes become even worse than when using NTP.

The inventor has further realized further problems present when achieving proper timing of audio. In a wired digital packet based digital audio system, where the audio signal is generated at the receiver side, accurate timing differences must be known to ensure audio is played at the same time on all speaker units. The traditional solution is to use the RTT (Round-Trip Time). In short this means that a data packet is first sent from the master server 100 or transmitter to the receiver or speaker unit 110, and in response thereto a data packet is sent from the receiver 110 back to the transmitter 100. Both data packets include information about the respective local clock.

If the transmission time is the same in both directions, then the difference between the two local clocks could be easily retrieved and used for acquiring proper timing. However, the inventor has realized that in a wireless system, using robust transmission technologies with for instance re-transmission and collision avoidance control, the transmission time will not be constant nor the same in both directions nor can it be easily measured. This is identified by the inventor as one of the key issues a synchronized wireless system need to overcome.

In addition to this problem of how to retrieve accurate timing information in a wireless system there will always be some level of interference on a radio frequency channel which will limit the bandwidth (data rate) needed to send enough audio data to all receivers. Secondly, even though packets are being re-transmitted, there will be a limit when the audio information will either arrive too late or be lost if the number of re-transmissions has reached the maximum number of attempts. It is thereby important to reduce both the probability for this to happen and to limit the effect of this when it does happen to avoid a bad user-experience, i.e. improper timing of the audio.

As mentioned above, the accuracy required for synchronization is very high. Wow and flutter is a term traditionally used for vinyl players struggling with keeping constant speed when playing. This problem basically disappeared when the audio sources became digital and crystal clocks generate the frequency that control the speed at which the audio is being played. However, as the inventor has realized, even if a crystal clock provides a very constant frequency (clock speed), the frequency will still have both a small absolute error and a small variation over time compared to other crystal clocks. As the inventor has realized, this is one error source an audio synchronization system needs to adjust for since all speakers will have their own local clock in a distributed system. If this is not done properly the listener will in worst case become nauseous.

As most users of audio systems do not have specially built acoustic rooms with one single chair in the middle when listening to music. Users usually want to be able to walk around, talk to their guests or make dinner at the same time as they play their favourite songs. This probably means the user increases the volume a bit which leads to that no one can sit close to the speaker. It also leads to that much of the sound heard are indirect sounds, sound that is bounced at least once one the floor, ceiling or wall on its way from the speaker. What reaches the user's ears is a combination of all these bounced sounds. And, possibly also a piece of direct sound from the speaker. All these sounds have travelled different distances until it reached the user and also been altered depending on what object it bounced on. Also, by using more speakers the speakers can be smaller and thereby easier to place. Producing sound is about moving air. If there are more speakers the speakers will not need to be 12 inch speakers with a 100 W amplifier each. Furthermore, the DSP algorithms commonly used to make a small speaker sound "big" are only true as long as a listener are standing close to the speaker. The use of many small speakers thus increase the chance of a user standing close to a speaker. It is thus highly beneficial to provide a speaker system with many small speakers.

However, as the number of speakers grow, so does the need for synchronization, wherefore it becomes even more important to overcome the synchronization issues discussed above, in order to provide a properly balanced (as refers to audio volume and timing) audio system.

There is thus a need for an improved synchronization of playback in wireless audio systems. This need has been present since the very first wireless speaker systems were introduced and the problems associated are thus indeed longstanding problems.

SUMMARY

As stated in the background, the inventor has realized that there are at least two main problems with contemporary wireless audio systems; one being that the transmission is still suffering from neighbouring systems, and another being that there are (still) synchronization issues when transmitting digital audio data.

The inventor has also realized that this problem of synchronizing the playback is actually consisting of more than one technical problem. One such technical problem lies in that all units, both the transmitter unit and the speaker unit(s) must be in agreement of the current playback time, i.e. their clocks must be synchronized. Another such technical problem lies in that as the audio data is transmitted ahead of their intended time for playback, and as there can be substantial increases in latencies due to retransmissions and some data packages may also arrive out of order, due to being retransmitted for various reasons, the data packages can thus arrive at different times at the various speaker units. However, to avoid effects such as echo effects, the intended playback time must be the same in all units.

The three problems realized and identified by the inventor may be summarized as:
  Enable enough data bandwidth and low latency to make sure the wireless network can distribute all information without too long delay.
  Distribute time knowledge so all units knows when audio samples should be played.
  Make sure audio samples are played at the expected time.
  Other formulations of these problems and other problems realized by the inventor after insightful and inventive reasoning are discussed above in the background section.

An object of the present teachings is to overcome or at least reduce or mitigate the problems discussed in the background section.

According to one aspect there is provided a transmission unit arranged to be used in an audio system comprising a plurality of speaker units, wherein the transmission unit comprises a controller and a wireless communication interface, for example arranged for communication according to an IEEE 802.11 standard (WiFi™), wherein the controller is configured to: transmit a plurality if audio data packages to be played back over the wireless communication interface (103) utilizing the same protocol for the transmission of the audio data package and for synchronizing the playback of the audio data and schedule the transmission of the plurality if audio data packages to optimize the timestamps for the audio data packages.

This has the benefits that the improved accuracy of the timestamps leads to an improved accuracy of the measurement of transmission times, which in turn leads to a determination of an accurate clock offset (or clock difference).

In some embodiments the controller is further configured to schedule the transmission of the plurality if audio data packages to optimize the timestamps by transmitting the audio data packages at a rate corresponding to the highest capability of the audio system.

In some embodiments the controller is further configured to schedule the transmission of the plurality if audio data packages to optimize the timestamps by transmitting the audio data packages at a rate of at least one audio data package every 10 ms.

By sending packages (as) often (as possible), more timestamps are provided for a given time period which enables for a faster synchronization, a more (statistically) accurate determination of clock difference/clock offset: This also brings about the benefits of less interference from other transmitters (as packages form those transmitters will be blocked). It also limits the cost of a lost or delayed audio data package, as the length of the audio of a package is not long and the loss or delay will thus possibly not even be noticed by a listener.

In some embodiments the controller is further configured to schedule the transmission of the plurality if audio data packages to optimize the timestamps by transmitting the audio data packages changing the order of which the plurality of audio data package is transmitted to the speaker units.

In some embodiments the controller is further configured to schedule the transmission of the plurality if audio data packages to optimize the timestamps by transmitting the audio data packages changing the order of which the speaker units is prompted to respond in.

This brings about the benefits that the system delays are equalized between the speaker units which enables all speaker units to have similar or the same error in latency (i.e all have about the same delay over time). This also brings about a more stable transmission time as it avoids or reduces the risk of queues forming and/or collisions.

In some embodiments the controller is further configured to schedule the transmission of the plurality if audio data packages to optimize the timestamps by transmitting the plurality of audio data packages all at the same packet size.

This brings about the benefits that the system delays are equalized between the speaker units which enables all speaker units to have similar or the same error in transmission time In some embodiments the controller is further configured to determine a type of interference based on timestamps for the data packages.

In some embodiments the transmission unit comprises a speaker unit.

According to one aspect there is provided an audio system comprising a transmitter unit according to herein.

According to one aspect there is provided a speaker unit arranged to be used in an audio system comprising a transmission unit and zero or more other speaker units, wherein the speaker unit comprises a controller and a wireless communication interface, wherein the controller is configured to receive one or more audio data packages to be played back over the wireless communication interface (103) utilizing the same protocol for the transmission of the audio data package and for synchronizing the playback of the audio data.

In some embodiments the controller is further configured to determine if an indication to respond is present in the received one or more audio data packages and if so generate a response data package including one or more time stamps for receiving the one or more audio data packages and to transmit the response message to the transmitter unit.

In some embodiments the controller is further configured to determine a time stamp for the received one or more audio data packages, retrieve one or more further time stamps from the received one or more audio packages and determine a clock offset based on the time stamps.

An object of the present teachings is to overcome or at least reduce or mitigate the problems discussed in the background section.

According to one aspect there is provided an audio system (10) comprising a transmission unit (100) and a plurality of speaker units (110-1, 110-2, 10-N), wherein the transmission unit (100) comprises a controller (101) and a wireless communication interface (103), for example arranged for communication according to an IEEE 802.11 standard (WiFi™), wherein the controller (101) is configured to: receive an audio data package to be played back; and to transmit the audio data package to be played back over the wireless communication interface (103) utilizing the same protocol for the transmission of the audio data package and for synchronizing the playback of the audio data. The controller 101 is considered to include a clock of the transmitter unit 100. Each of plurality of the speaker units (110-1, 110-2, 10-N) comprises a controller (111), a PCM (111-1), a speaker element (114) and a wireless communication interface (113), for example arranged for communication according to an IEEE 802.11 standard (WiFi™), wherein the controller (111) is configured to: receive the at least one data package to be played back through the wireless communication interface (113) and to cause audio represented by the received audio data package to be played back through the speaker element (114) by feeding the audio data to the PCM (111-1) being connected to the speaker element (114). The controller 111 is considered to include a clock of the speaker 110.

The solution may be implemented as a software solution, a hardware solution or a mix of software and hardware components.

In one embodiment wherein the controller (101) of the transmitter unit (100) is further configured to determine if the size of the received audio data package exceeds a maximum size, and if so split up the received audio data package into at least one data package to be transmitted (220) each being of the maximum size; and to transmit the audio data package to be played back by transmitting the at least one data package to be played back at a time interval, wherein the time period does not exceed 10 ms, and wherein the controller (111) of the speaker unit (110) is further configured to receive the audio data package by receiving the at least one data package to be played back through the wireless communication interface (113).

In one embodiment the PCM (111-1) comprises an internal buffer (111-1a) and wherein the speaker unit (110) further comprises a receiving buffer (115) for temporarily storing the received audio data before feeding the audio data to the PCM (111-1).

In one embodiment the controller (101) of the transmitter unit (100) and/or the controller (111) of the speaker unit (100) are configured to: receive a plurality of time stamps; filter the received time stamps to determine a clock offset between the transmitter unit (100) and the speaker (unit 110) to be used to determine when audio data should be played back through the speaker 114; determine a variation of the clock offset per time unit; and adjust a clock speed according to the determined variation of the clock offset.

According to one aspect there is provided, a method an audio system (10) comprising a transmission unit (100) and a plurality of speaker units (110-1, 110-2, 10-N), wherein the transmission unit (100) comprises a controller (101) and a wireless communication interface (103), for example arranged for communication according to an IEEE 802.11 standard (WiFi™) and wherein each of plurality of the speaker units (110-1, 110-2, 10-N) comprises a controller (111), a PCM (111-1), a speaker element (114) and a wireless communication interface (113), for example arranged for communication according to an IEEE 802.11 standard (WiFi™), wherein the method comprises, in the transmission unit: receiving an audio data package to be played back; and transmitting the audio data package to be played back over the wireless communication interface (103) utilizing the same protocol for the transmission of the audio data package and for synchronizing the playback of the audio data, and wherein the method further comprises, in at least one of the speaker units: receiving the at least one data package to be played back through the wireless communication interface (113) and causing audio represented by the received audio data package to be played back through the speaker element (114) by feeding the audio data to the PCM (111-1) being connected to the speaker element (114).

According to one aspect there is provided a computer-readable medium carrying computer instructions that when loaded into and executed by a controller of a unit of an audio system 10 enables the viewing device to implement a method according to herein.

The solutions proposed herein enable for a wireless (WiFi) audio time synch without changing behaviour of management/beacon packets by combining a protocol for audio transfer and time synchronization. This increases timestamps accuracy, but also increases the number of timestamps for statistical calculations.

The proposed solutions ensure all wireless clients, if perfect clock alignment not possible, experience the same error to accomplish synchronized output.

Further embodiments and advantages of the present invention will be given in the detailed description.

BRIEF DESCRIPTION OF THE DRAWINGS

Embodiments of the invention will be described in the following, reference being made to the appended drawings which illustrate non-limiting examples of how the inventive concept can be reduced into practice.

DETAILED DESCRIPTION

Figure 1A:
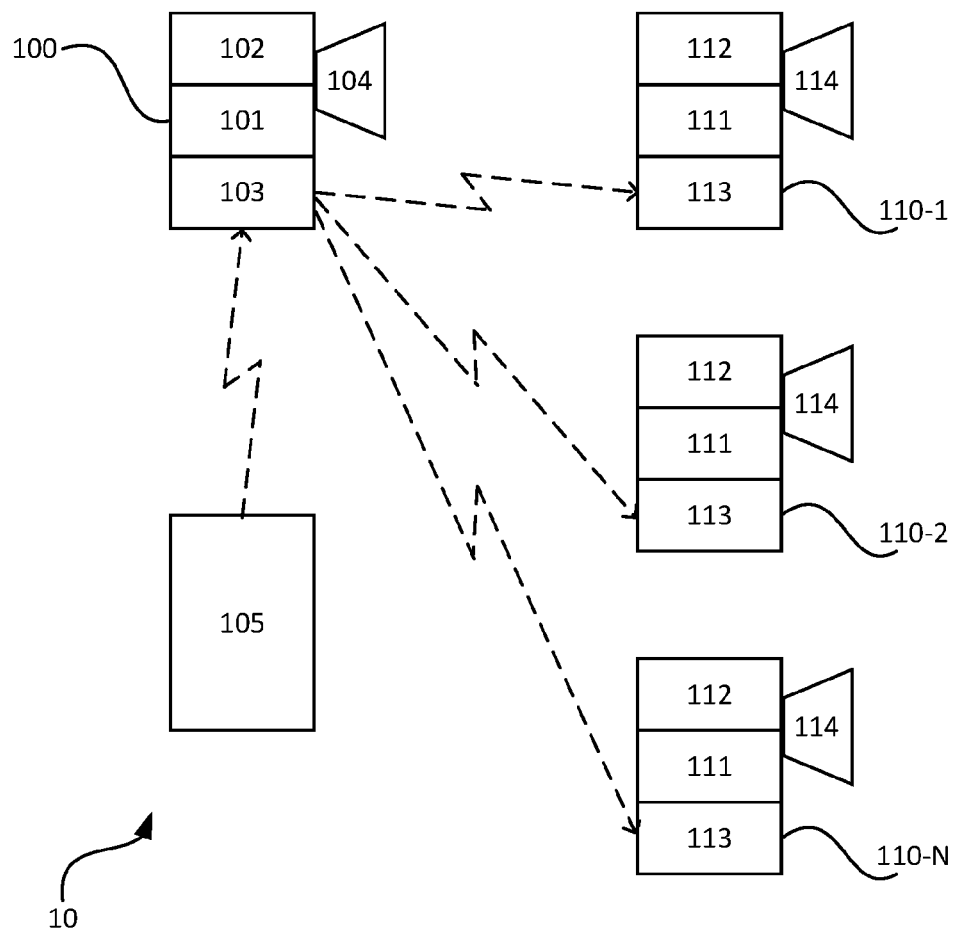
FIG. 1A shows a schematic view of a wireless audio system according to an embodiment of the present invention.
Figure 1B:
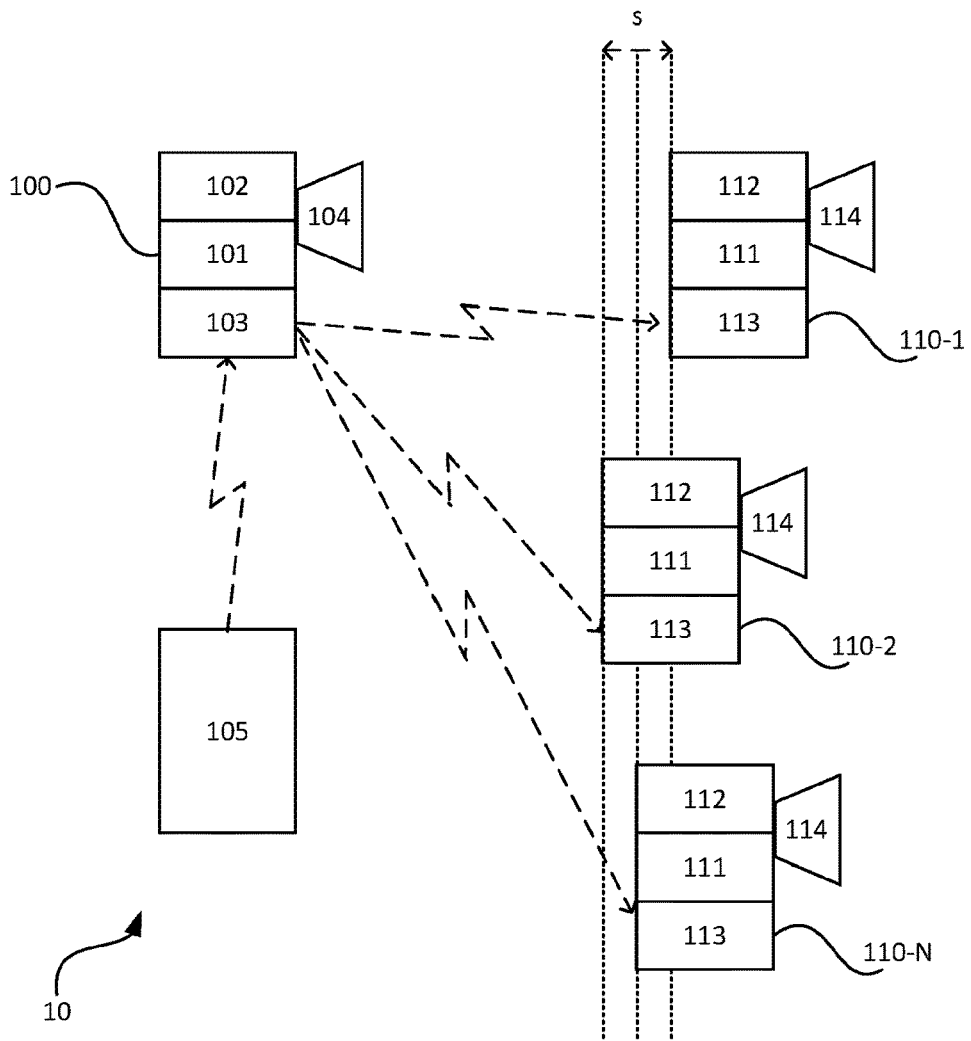
FIG. 1B shows a schematic view of a wireless audio system according to an embodiment of the present invention.

As stated in the background section, FIG. 1 shows a schematic view of a wireless audio system 10. The wireless audio system 10 comprises a server unit 100 that is implemented as a Radio Frequency (RF) transmitter and will hereafter be referred to as a transmitter unit 100.

The transmitter unit 100 is arranged to receive audio data from an audio source 105. The audio source 105 may be any audio providing device, such as a television set, a multimedia device, a computer, a music player, a radio, a game station and so on. The exact nature of the media source is not essential, only that it provides audio data representing audio to be played through the audio system 10. The music source 105 may even be comprised within the transmitter unit 100.

The transmitter unit 100 comprises a communications interface 103. The communications interface 103 comprises a wireless component, but may also comprise a wired component. In fact, the communication interface 103 may comprise several interfaces.

The communication interface 103 comprises a radio frequency (RF) communications interface. In one embodiment the communication interface comprises a WiFi™ interface. In one embodiment the communication interface comprises a Bluetooth™ interface.

In an alternative or supplemental such embodiment the communication interface comprises a cellular communications interface such as a fifth generation (5G) cellular communication interface, an LTE (Long Term Evolution) interface and/or other interface commonly used for cellular communication. Such a cellular interface may be used for enabling the transmitter unit 100 to operate as an audio source receiving music data from an external server (not shown).

In one embodiment the communication interface 103 comprises a wired communication interface. In one such embodiment the communication interface 103 comprises a RCA (Radio Corporation of America) connector, sometimes called a phono connector. In one such embodiment the communication interface 103 comprises a phone connector, also known as phone jack, audio jack, headphone jack or jack plug. In one such embodiment the communication interface 103 comprises a HDMI (High Definition Multimedia Interface) interface. In one such embodiment the communication interface 103 comprises a Display Port interface. In one such embodiment the communication interface 103 comprises an Ethernet interface. In one such embodiment the communication interface 103 comprises a MIPI (Mobile Industry Processor Interface) interface. In one such embodiment the communication interface 103 comprises a USB (Universal Serial Bus) interface. In one such embodiment, the communication interface 103 comprises a Sony/Philips Digital Interface (S/PDIF).

As mentioned, in some embodiments, the communications interface 103 is configured to enable communication through more than one of the example technologies given above. As an example, a wired interface, such as RCA, could be used for establishing an interface between the transmitter unit 100 and the audio source 105, and a WFi™ interface could be used to enable communication between the transmitter unit 100 and a speaker unit 110.

The transmitter unit 100 also comprises a controller 101 and a memory 102. The controller 101 is configured to handle the reception of incoming audio data from the audio source, possibly repackaging the audio data and forwarding the audio data to the various speaker units 110-1, 110-2, 110-N. The controller 101 is also configured to control the overall operation of the transmitter unit 100. In one embodiment, the controller 101 is a general purpose controller. In one embodiment, the controller 101 is a combination of a Digital Signal Processor (DSP) and a general purpose controller. As a skilled person would understand there are many alternatives for how to implement a controller, such as using Field-Programmable Gate Arrays circuits, ASIC, GPU, etc. in addition or as an alternative. For the purpose of this application, all such possibilities and alternatives will be referred to simply as the controller 101.

The memory 102 is configured to store or buffer audio data and computer-readable instructions that when loaded into the controller 101 indicates how the transmitter unit 100 is to be controlled. The memory 102 may comprise several memory units or devices, but they will be perceived as being part of the same overall memory 102. There may be one memory unit for buffering audio data, one memory unit for instructions sets, one memory unit for settings for the communications interface 103, and so on. As a skilled person would understand there are many possibilities of how to select where data should be stored and the general memory 102 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. For the purpose of this application all such alternatives will be referred to simply as the memory 102.

The transmitter unit 100 is configured to receive audio data and forward at least a portion of the audio data to one or more speaker units 110-1, 110-2 . . . 110-N. Each wireless speaker unit 110 has a wireless communication interface 113 through which the audio data is received, and a controller 111 that is configured to transform the audio data into audio that is played through one or more speaker elements 104. The controller 111 may be configured for handling PCM (pulse code manipulation) coded data packages. The speaker unit also comprises a memory 112 on which audio data may be stored or buffered, and which memory 112 also stores computer readable instructions for enabling the controller 111 to control the operation of the speaker unit 110. As for the communication interface 103, the memory 102 and the controller 101 of the transmitter unit 100, there are many possibilities of how to implement such a communication interface 113, a memory 112 and a controller 111. Such possibilities are discussed in detail with reference to the transmitter unit 100 and are also applicable to the speaker unit 110.

The speaker unit 110 comprises speaker elements 114 through which audio corresponding to the received audio data (as decoded by the controller 111) is played back through.

It should be noted that the transmitter unit 100 may also comprise speaker elements 104 and may then both act as the transmitter unit 100 and as a speaker unit 110. However, in such an embodiment, the audio data is not transmitted through the communication interface, but rather through an internal bus or other connection between the controller and the speaker elements 104.

As stated above, there are at least three problems that the inventor has identified, which may be summarized as ho to:
  enable enough data bandwidth and low latency to make sure the wireless network can distribute all information without too long delay.
  distribute time knowledge so all units knows when audio samples should be played.
  make sure audio samples are played at the expected time.

To overcome the identified and realized problems of the prior art, the inventor is proposing an inventively simple and elegant manner of transmitting the data packages that overcomes—or at least mitigates—the problems discussed above in one go, namely to utilize a combined protocol for both the audio data transfer and for the time synchronization.

In one aspect the inventor is proposing to go against current thinking of reducing bandwidth and to transmit the audio data in smaller packages and at shorter intervals.

Digital audio data is by nature a continuous stream of samples. When sent over a packet based network the stream is split into pieces and each piece is added as payload in a packet. Prior art systems for audio transmission are aimed at relative large payloads. One reason for this is to comply with certain data compression methodologies. Another reason is to or to increase the efficiency for data compression. Another reason is be to align the data package with a defined buffer size used by the device converting the digital audio into analog audio or just to decrease CPU or network load. There is thus a strong prejudice in the art that using a large payload is preferable in that it brings about many perceived benefits.

However, as the inventor has realized, it is instead better to optimize the packet interval and packet size independently from other parts of the system, wherefore the inventor is proposing to go against the prevalent thinking and use relatively small payloads of data.

One benefit of this is that it limits the effect of a loss of a packet if each packet has a very short time of audio data. The consequence of a lost or delayed packet is not as severe if the payload is small as the system would only lose 2 ms instead of 50 ms of audio. It will be a lot easier to compensate for any missing data on the receiver side with minimal effort and minimal audibility.

Adding smaller pieces of audio data in each packet also comes with more benefits. The result is that more packets per time unit needs to be sent and this will reduce the interference from other wireless transmitters trying to send on the same or adjacent radio channels. This since it will increase the probability for other transmitters to back-off and/or to select a different, less busy, radio channel.

Smaller pieces of audio data per packet will also decrease the latency described in the above since less data need to be stored in buffers on both the transmitter and the receiver side.

In addition to this, if also adding time synchronization data as part of the payload, it will be possible to gather more data per time unit and the data from transmission time measurements will have closer time intervals which will enable better analysis of the collected data.

So combining audio payload with transmission time measurements, and to do this as often as possible using small payloads, will not only enable more accurate time synchronization, it will also enable reaching a required time synchronization faster after a system has been started and to reduce the likelihood and the effect of interference.

The simple and highly efficient manner of transmitting the data in smaller packages and at shorter intervals effectively combines the data transfer protocol and the timing protocol into one protocol, namely that of the smaller data packages.

The inventor is also proposing to use a fixed or same packet size for most if not all data packages. Many radio transmitters and receivers do not have support for creating a timestamp exactly when the packet is sent and/or received. Instead this is done by software, likely in firmware, driver or in the operating system. Most noise on timestamps come from back-off and re-transmission of packets, but timestamp accuracy is also affected by the handling of the packets by the software.

By reducing the data packet size, the total number of packages is increased. By using a more or less fixed data packet size, the difference in handling or processing time of the data packages becomes more or less the same. The increased number of packages provide for a better statistical foundation for approximating or fixating the error in the time stamp accuracy, and the proposed solution will therefore provide for a system, where the error may be seen as a constant and thus part of the transmission time and will be the same for all devices, and can therefore be handled in a simple manner.

It should be pointed out, that the inventor has not circumvented the problem of synchronizing the time stamps, but simplified it by making any previous errors or differences into a constant factor to be included in any calculations of a time to play audio data.

The inventor is also proposing to schedule the events of transmitting the data packages to other events.

Figure 2:
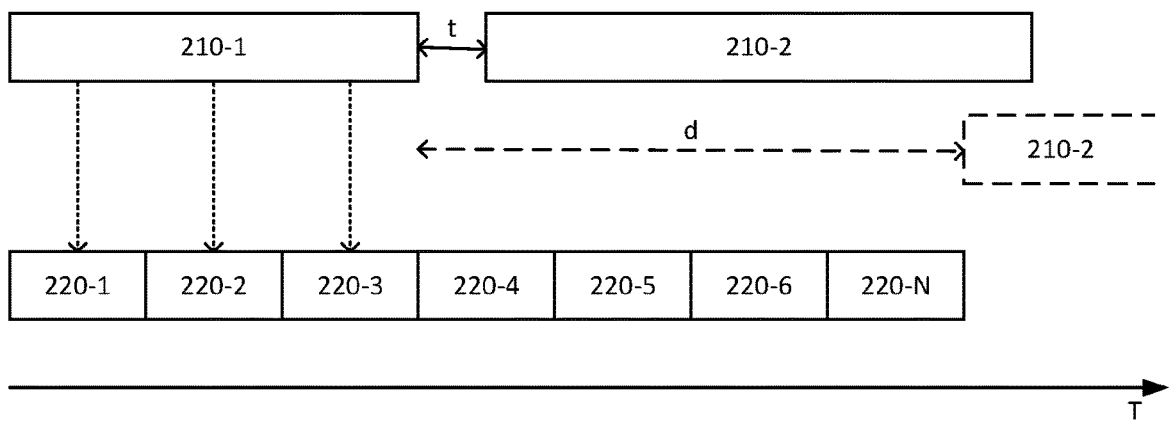
FIG. 2 shows a schematic view of prior art data packages and data packages according to the teachings herein and how they are transmitted over time according to one embodiment of the teachings herein.

FIG. 2 shows a schematic view of prior art data packages 210 and data packages 220 according to the teachings herein and how they are transmitted over time. It should be noted that the figure is not to scale, especially not when it comes to the time needed to transmit data packages compared to the time between transmissions, and it should be noted that the figure is only for illustrative purposes.

FIG. 2 shows two prior art data packages, a first prior art data package 210-1 and a second prior art data package 210-2. As can be seen, the first prior art data package 210-1 is of a different size than the second prior art data package 210-2.

A neighbouring device transmitting on the same channel may interrupt and start sending in the silent time space t between two prior art data packages 210, which will block the transmitter unit 100 and cause a delay d until the second prior art data package 210-2 can be transmitted, causing unnecessary delay and decrease of the bandwidth. Prior art solutions to this includes adding a guard to the data packet. However, a guard does not solve the synchronization problem(s).

As the audio system 10 comprises several units all communicating over the same (set) of channels, it is not easy for the audio system 10 to change data channel when one is being blocked. The solution to simply jump to another (set of) data channel(s) is thus not a good solution.

The inventor is proposing to reduce the size of the data packages already at the application level before reaching any hardware (specific) layers of the transmitting model (such as OSI model) and the lower part of FIG. 2 shows a schematic view of data packages 220 according to the teachings herein. As can be seen they are of a reduced size and most—if not all—are of the same size. Examples of sizes are 576 bytes, 864 bytes and 1152 bytes corresponding to a transmission interval of 4 ms, 6 ms and 8 ms respectively. The size of a data package is set to be constant, but an ending package may be of a smaller size. However, on average over time most if not all packages are the same size.

In some embodiments the size is the same for at least session, such as for one media file or for each time the audio device is activated, which enables a dynamic adaptation of the package size depending on environmental factors.

The upper limit of how often a packet can be sent is limited by the performance of the platforms on which the system is being implementation on and on the quality of the radio channel(s). The transmitter unit 100 is thus in some embodiments configured to transmit the audio data packages at a rate corresponding to the highest capability of the audio system. Different systems have different capabilities and it would be impossible to list all variations, but a skilled person would be able to find out a rate after only basic experimentation, but as a general guide line a number between 1 ms and 10 ms is suggested. Since keeping the packet interval independent from other system parts this number can be altered to become optimal for a certain combination of platforms and radio channel quality.

The lower limit of how seldom a packet can be sent depends on the platforms maximum packet payload size, and the accepted latency. The latency will increase if longer pieces of audio data is stored in each packet.

The prior art data packages (arriving from the audio source 105) are thus split up and the data to be transmitted is allocated to the smaller data packages of the teachings herein, as indicated by the vertical dotted arrows in FIG. 2. The controller is configured to receive audio data to be transmitted, determine if the data is above a maximum transmission unit size, or if they will result in a data package being of a size exceeding the maximum transmission unit size, and if so split up the audio data to be transmitted into smaller packages, each of the maximum transmission unit size (or smaller for the trailing packages). In the context herein, there will be made no difference between a data set being of a maximum transmission unit size and a data set resulting in a maximum transmission unit size, as in they can be made to mean the same, by only changing the actual value of the maximum transmission unit size by adapting it for the data needed for the actual package.

In one embodiment all packages except trailing packages are of the same size, and the trailing package is of a smaller size. The trailing packages are packages carrying the audio data that is left over after splitting up the audio data to be transmitted into the smaller packages, i.e. the packages carrying the trailing audio data.

In one embodiment all packages including trailing packages are of the same size.

The inventor is also proposing to transmit the data packages at shorter intervals and the lower part of FIG. 2 shows that the data packages 220 according to the teachings herein are transmitted much closer together. The interval between transmitting the data packages is in one embodiment 1 millisecond, i.e. one audio data package is transmitted every millisecond. Alternative embodiments for the time interval are 0.5, 1.5, 2, 4, 6, 8, 10 in the range 0.1-1, in the range 0.1-2, in the range 1-4, in the range 2-6, in the range 2-8, in the range 4-8 or in the range 4-10 milliseconds. In one embodiment the time interval is dependent on the bit rate used. The inventor has realized that even though handling smaller packages already at the application level increases the (internal as well as external) bandwidth required (as each package carries an overhead of data in the form of headers for example), this apparent drawback is compensated for by the increased overall performance. The inventor has thus realized that by going against the contemporary prejudice of the commonly imposed requirements of reducing required bandwidth, the inventors are able to bring about an overall performance.

Setting the package size already at the application level ensures that any handling time imposed by software is also included in the overall handling time, ensuring that the overall handling time becomes more or less constant.

The controller 101 of the transmitter unit 100 is thus configured to receive an audio data package to be transmitted and ensuring that the audio data package size does not exceed the package size and transmit the data packages 220 at short time intervals. If the received data package 210 exceeds the package size, the controller 101 is configured to split up the received audio data package 210 into smaller audio data packages 220 being of a standardized size (apart from possibly the last one). This is indicated by the dotted arrows in FIG. 2 showing how the first prior art data package 210-1 is split up into three audio data packages 220-1, 220-2, 220-3 according to the teachings herein. As stated above, this is done already at the application level in one embodiment. The audio data packages 220 according to the teachings herein are smaller, they take a shorter time to prepare, shorter time to transmit and shorter time to retransmit if necessary. They are also transmitted more frequently thereby less likely to leave open silent time periods t where other devices may occupy the data channel. The transmission manner according to herein is thereby designed to block out other neighboring devices, ensuring that the audio system 10 is able to fully utilize the (set of) data channel(s). As other devices are most likely not part of a system comprising many devices (as this is the case in most situations if not all, where wireless audio systems are installed), it is easier for those other devices to jump to another (set of) channel(s). The inventive manner of transmitting the packages thereby does not significantly affect the performance of the other devices, while increasing or ensuring the performance of the audio system according to herein.

It should be noted that even of the data packages according to herein are referred to as audio data packages, they may also carry other data, such as connection data or other control data. For the purposes of the teachings herein, there will be made no difference between a data package carrying audio data and a data package carrying control data, and the description will focus on the audio data packages, simply noting that the same manner of transmitting data may be used regardless of what data is transmitted.

As mentioned above, most, if not all (i.e. all on average over time), audio data packages 220 are of the same size. This also means that all data packages take roughly the same time to prepare, transmit, receive and handle. The actual transmission time is in most cases insignificant and negligible as the radio frequency technologies utilized to transmit the data packages have ranges that are too short to incur any noticeable time delays for the actual transmission of the data package. For example the actual transmission time using a radio frequency signal over 10 meters (a common maximum range for wireless audio systems) is roughly $10/3 \times 10^8 = 3 \times 10^{-8}$, that is in the order of nanoseconds and therefore negligible.

The inventor is also proposing to enable the transmitter unit 100 to measure the time it takes for each speaker unit 110, by querying the speaker units 110 one by one.

Figure 3:
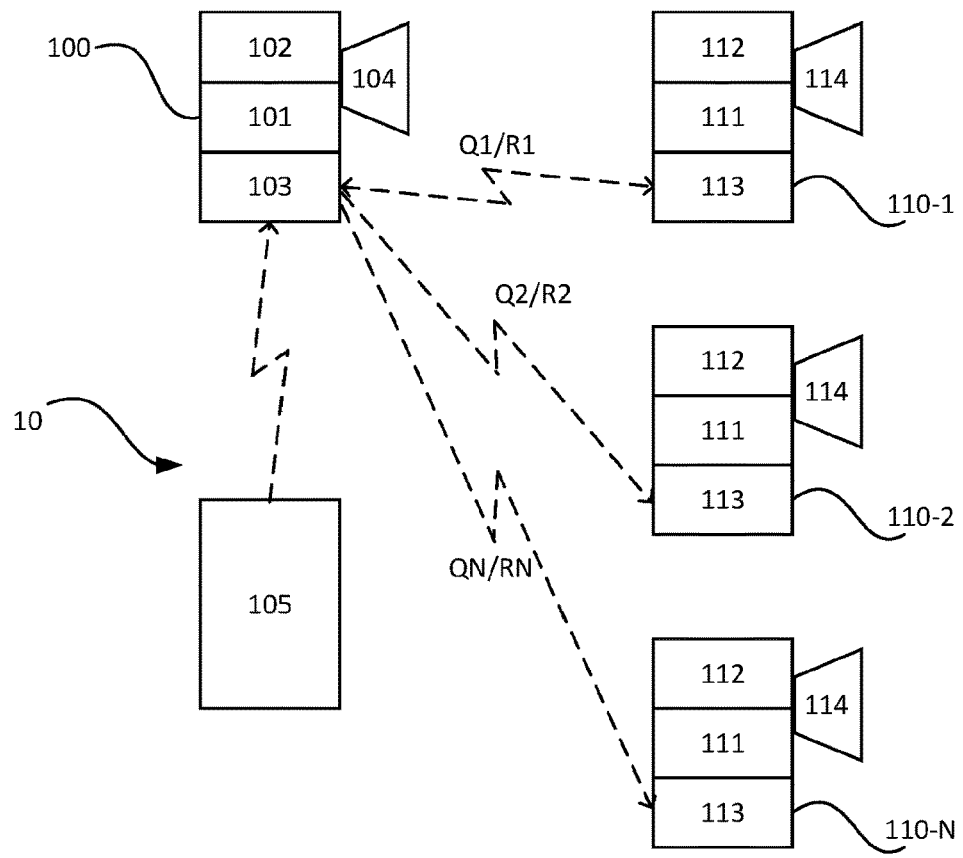
FIG. 3 show one example embodiment of how a transmitter unit sends a query to and receives responses from one speaker unit at a time according to one embodiment of the teachings herein.

FIG. 3 shows a schematic view of how the transmitter unit 100 sends a query to and receives responses from one speaker unit at a time. First, the first speaker unit 110-1 is queried by a first query Q1 and provides a first response R1. The query Q1 is of the same size as the audio data package, and so is the response R1. The time it takes from transmitting the query Q1 to receiving the response R1 is measured by the transmitter unit 100 and this time indicates the time it takes for the first speaker unit 110-1 to handle two packages (one incoming and one outgoing).

The procedure is repeated for the other speaker units 110-2, 110-N by transmitting a second query Q2, receiving a second response R2 and transmitting an N-th query QN, receiving an N-th response RN.

As all data packages are of the same size and the query and the response is of the same size, the transmission time (including processing) for an audio data package is thus half the measured time for the query-response transmission.

Each audio data package carries a time stamp that indicates when the audio of the audio data package is to be played back. However, in order to synchronize these time stamps it was important in prior art systems to know the error or difference between speaker units so that the audio is played back at the same time in all speakers. In such contemporary systems, the problems relating to the synchronization arises in part form that there is an unknown error in the time measurement as it is not known exactly where the time is spent by the various units. This error (or variance) arose from the processing of the data package and that this took a different time for different units. However, as this error varied also with the data package, this was of major concern and a long-standing problem and many engineers have tried to solve such issues.

However, and as the inventor has realized and which lies at the simple elegancy of the proposed teachings, as all data packages of the present teachings are of the same size, the actual size of the error does not matter as it will be the same for all data packages.

In one embodiment, as the inventor has realized, the same package data size is used for data packages that do not necessarily carry audio information.

In one embodiment, the same package data size is used for data packages that are transmitted to the transmitter unit. In such an embodiment, the same data package size is thus used for packages being transmitted from the transmitter unit to the speaker unit(s), and from the speaker unit(s) to the transmitter unit.

Using the same data package size for all or most data packages, increase the statistical accuracy of determining the size of the error (i.e. the time it takes to process and handle a data package).

As the error will be substantially the same for all data packages the error may be seen as part of the transmission time and the error therefore does not affect the synchronization, it becomes part of it. The controller 111 of a speaker unit 110 and/or the controller 101 of the transmission unit 100, may easily calculate a playback time based on a time stamp of the audio data and the transmission time for the speaker unit 110.

The various speaker units 110 will thus be synchronized to each other in the manner that they perform playback at the same time, just only delayed (all of them and for all packages, i.e. at the start of the playback) by a time corresponding to the error. The error is simply included in the transmission time as a constant and only ever comes in to effect at the very start of a playback. The error is typically in the order of milliseconds and a single delay at start of playback in the order of milliseconds will not affect the listening experience as the user will most likely not even notice any delay shorter than 50 ms.

Furthermore, as the inventor is proposing to transmit shorter data packages and at a higher frequency, there will also be more data packages that may be timed and the size of the transmission time and the error is therefore statistically certain.

Figure 4:
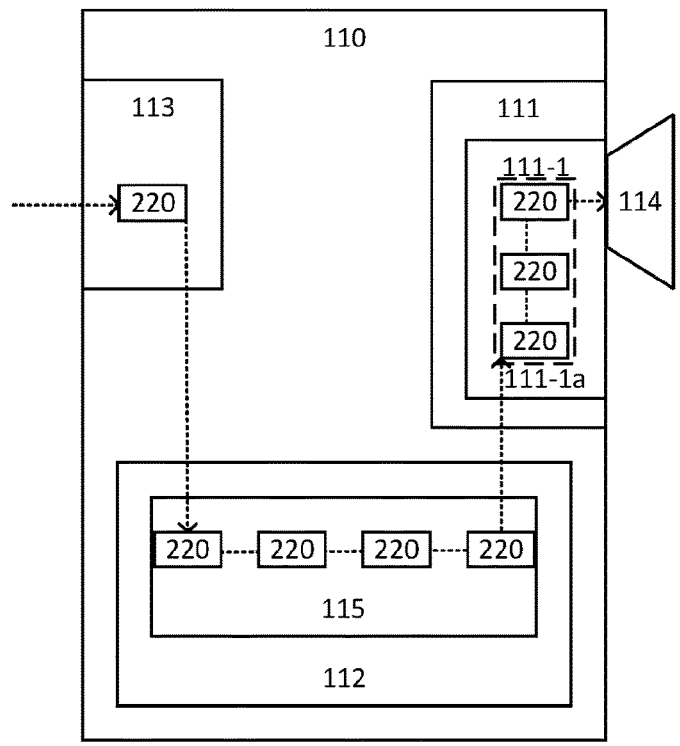
FIG. 4 shows a schematic view of a speaker unit according to one embodiment of the teachings herein.

FIG. 4 shows a schematic view of a speaker unit 110 according to the teachings herein. As mentioned above, a transmitter unit 100 may itself comprise a speaker unit, wherefore FIG. 4 may also be seen as showing a schematic view of a transmitter unit 100.

A controller 111 of the speaker unit 110 is configured to receive an audio data package 220 and to store it in a playback buffer 115 in a memory 112 before playing the audio represented by the audio data through the speaker elements 114 at a time indicated by the time stamp. As the communication interface 113 receives the audio data package 220, the audio data package 220 is processed by the controller 111 determining the identity or order of the audio data package 220 (possibly to determine if it is transmitted in order or if it has been retransmitted) and stores the audio data package 220 in the playback buffer 115, in the order that the audio is to be played. If the packages arrive in order, the playback buffer 115 is a First-In-First-Out buffer. The controller 111 later fetches an audio data package 220 from the end of the playback buffer 115 and processes the data package 220 in a Pulse Code Modulation (PCM) subsystem 111-1 before playing it back through the speaker element 114 at the time indicated by the time stamp. As the time stamp is adapted based on the known handling and transmission time, which includes the more or less constant error, all speaker units 110 will be synchronized.

The buffer 115 also serves to enable different time intervals used for the transmission of packages and the time interval for sampling of the PCM. The PCM usually operates at around 20 ms, which is much longer than the proposed transmission intervals proposed herein. The additional 115 buffer therefore also enables receipts to be transmitted at shorter intervals, further helping the speaker system to cause other systems/units to back off the used channel(s). This also allows for having different intervals between packet transmission and PCM handling. This solves the issues caused by that information from the PCM, like how much data a PCM buffer 111-1a contains at a certain time, is not updated continuously and is instead only updated at intervals decided by the PCM subsystem itself.

The time interval for transmitting data packages has a lower limit set by how fast the transmitter can send individual packets in addition to the response time of the receivers. The lower limit is only the time it takes for the receivers to send the response packet. It is a benefit to keep the channel as busy as possible and thereby send the packets as often as possible. This to make any potential competing transmitters to end up in 'back off' mode as often as possible and thereby accomplish some sort of 'higher priority' for the traffic on the shared channel. This also effectively makes new networks select a different channel since it will easier sense the presence of this network, as is discussed above. As the inventor has realized, the PCM has an optimal time interval depending on the PCM subsystem in combination with the speaker unit. Usually the internal PCM buffer size (not the same as the receiving buffer 115) cannot be set to an arbitrary number of samples. Also the clock controlling the PCM is not necessary the same as for the clock for the rest of the speaker unit which can cause them to drift relative each other. This makes it difficult to know, without interaction with the PCM when it is needed to load with new data. In addition to this the information needed to decide how much and when to transfer data to the PCM is not updated continuously. If the interval between transferring data to the PCM is too short it will heavily affect the performance of the host system. If instead the interval is too long, the PCM buffer size need to be large and thereby increasing the latency before samples are actually played.

The solution of having the additional receiving buffer 115 allows for the operation mode for the PCM to be chosen so the PCM can decide independently when it is a proper time to transfer new data to be played. This makes it easier to keep track of if the PCM status information is valid and the load of the speaker unit will become minimal with the defined PCM buffer size.

An additional benefit with adding the additional buffer 115 FIFO between the network/packet handling and the PCM is that if packets are getting retransmitted due to packet loss this will result in samples arriving later to the receiver than usual. If receivers report back their individual usage of its buffer to the transmitter, the transmitter can then adjust all receivers to either extend or reduce the buffer size to get minimal latency through the system depending in the current radio channel/performance.

Also, by storing packages in the additional buffer and taken into account the knowledge when these packages probably will need to be transferred to the PCM, it is possible to know how much time a potential processing of the samples can take before risking starving the PCM. As an example, if the radio performance drops for a short time of period, a long filter can be replaced by a shorter filter and thereby reduce the performance of the filter, but on the other hand not risking to starve the PCM and get clearly audible glitches.

In addition to or as an alternative to the synchronization as taught herein, making the error constant, the inventor is also proposing to utilize a two-fold synchronization where a time stamp is supplemented by a virtual time stamp.

As discussed, timestamps from a PCM/soundcard usually have very bad accuracy, in other words they are usually very noisy. One reason for this is, as discussed herein, is that a SW implementation is used. In addition to this, depending on the PCM system implementation, the clock used for timestamps might not be the same clock as used by the host system which causes a clock drift. This affects the algorithms used in such a way that it will be hard to know at a certain point of time when samples need to be added or removed to adjust the output to be played at a certain moment, i.e. when to play an audio sample. Filtering these noisy timestamps to get the required accuracy can be very expensive computationally wise and might also add a delay that depends on the clock drift. This delay can be compensated for if analyzing the clock drift further and compensate for the delay. But this increases the implementation cost even further.

Another prior art solution is to create a virtual timestamp by counting the number of samples added to the PCM queue in combination with the time when the PCM starts or from the timestamp form the very first sample. Then a noise free and linear time can be accomplished. The problem with this solution is that the timestamp for PCM start also has too low accuracy and the result will be an unknown, and sometimes drifting, offset depending on the host clock in combination with the PCM system implementation.

The inventor is proposing to modify the two prior art solutions in a simple and ingenious manner where a filter is used; not to filter the noisy timestamps completely, but only to get the difference between the timestamps and the sample counter. If applying this offset to the sample count one gets both a noise free and offset free timestamp enabling the controller 111 to determine exactly when a certain sample will be played. This solution needs less computational power since the filter properties can be relaxed. One reason for being able to relax the requirements on the filter is that only offset between signals need to be obtained. This offset has properties that easily can be separated from the noise, as the offset has a much lower frequency (more or less a DC signal) compared to the noise which has a much higher frequency.

Figure 5:
FIG. 5 shows a schematic view of a data package to be transmitted according to one embodiment of the teachings herein.

FIG. 5 shows a schematic view of a data package to be transmitted 220. The data package is, in one embodiment, a data package as disclosed in relation to FIG. 220. In one embodiment, a time stamp TS is appended to the data package 220. Also shown is a sample counter SC that is also appended to the data package 220. As the time stamp TS and the sample counter have fixed sizes, it does not matter if they are appended to or included in the data package 220 as the size of the overall package will still be constant and the maximum size discussed in relation to FIG. 2 may be set to accommodate for this.

In one embodiment, filtering of the timestamps is used to retrieve the clock offset between transmitter and speaker. This offset value is be used to control when samples should be played. In addition to the momentary clock offset it is also useful to retrieve the variation of the clock drift when controlling the clock speed.

The inventor is proposing to improve the measurements of time stamps, by alternating which speaker unit 110 is transmitted to first, and/or to alternate which speaker unit 110 is to transmit a response first.

By indicating the order, and changing the order, the accuracy of the timestamps is increased as the speaker unit to transmit first is made ready to transmit at a certain time, which ensures that the transmitter or other units are not currently active transmitting, which would cause a delay to the speaker unit that is supposed to transmit.

Figure 6:
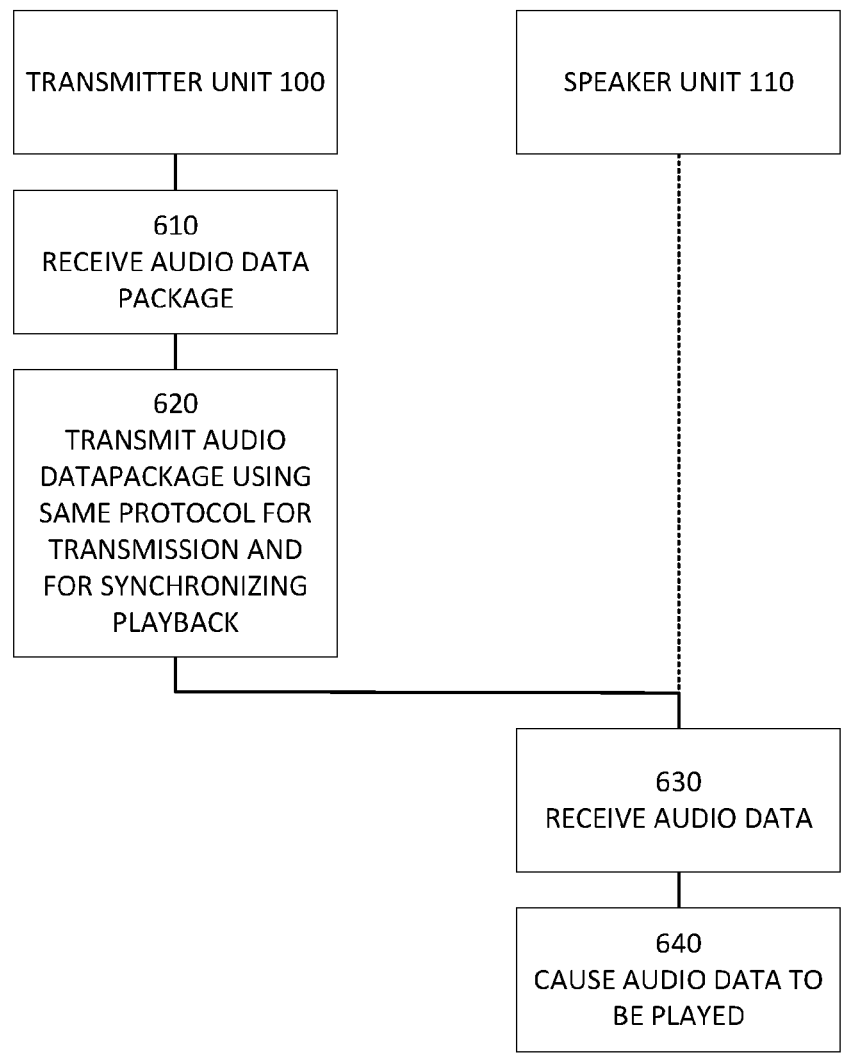
FIG. 6 shows a flowchart of a general method according to one embodiment of the teachings herein.

FIG. 6 shows a flowchart of a general method according to an embodiment of the teachings herein. The method utilizes an audio system 10 as discussed in the above comprising a transmission unit 100 and a plurality of speaker units 110-1, 110-2, 10-N. The method comprises, in the transmission unit 100 receiving 610 an audio data package to be played back; and transmitting 620 the audio data package to be played back over the wireless communication interface 103 utilizing the same protocol for the transmission of the audio data package and for synchronizing the playback of the audio data. The method further comprises, in at least one of the speaker units 110 receiving 630 the at least one data package to be played back 220 through the wireless communication interface 113 and causing 640 audio represented by the received audio data package to be played back through the speaker element 114 by feeding the audio data to the PCM 111-1 being connected to the speaker element 114.

Figure 7:
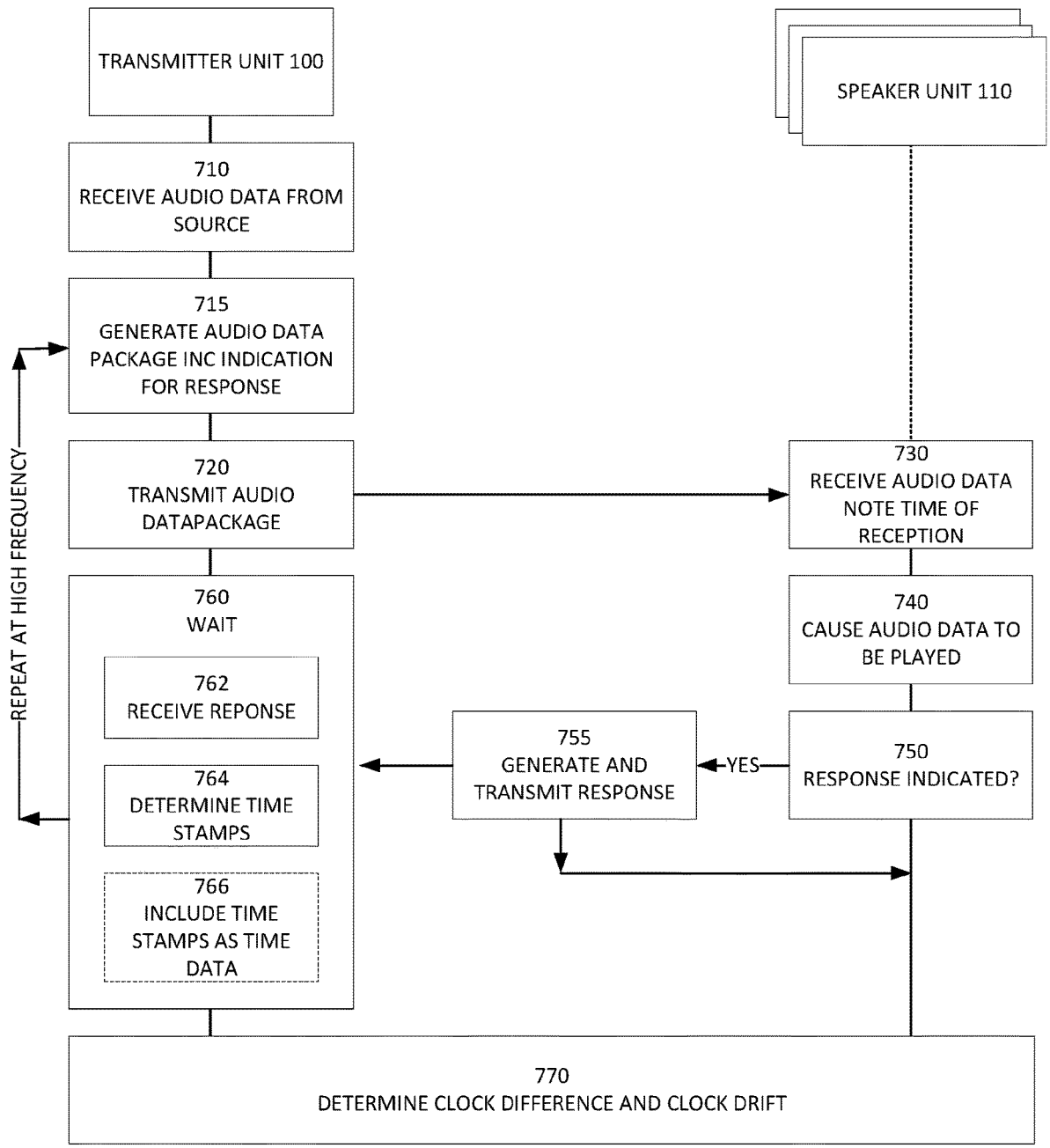
FIG. 7 shows a flowchart of a general method according to one embodiment of the teachings herein.

FIG. 7 shows a flowchart of a general method according to an embodiment of the teachings herein. Further details of the teachings as relates to how the synchronization is achieved according to herein will be discussed with reference to FIG. 7. The method utilizes an audio system 10 as discussed in the above comprising a transmission unit 100 and a plurality of speaker units 110-1, 110-2, 10-N. As in the method of FIG. 6, the method of FIG. 7 comprises receiving 710 audio data form a data source (105) and to generated 715 audio data packages to be transmitted based on the received audio data. The audio data packages to be transmitted are of a size not exceeding a maximum payload size. As in the above, if the received audio data is in packages exceeding the maximum payload size, the received packages are split onto several packages to be transmitted as part of generating the packages to be transmitted.

As discussed in the above, in order to be able to retrieve the time difference between two devices the transmission time for exchanging time information needs to be known. If one device is considered to be the transmitter unit (or masterserver) with a reference clock, the other device is a speaker unit (or client), where both the absolute time error compared to the transmitter and the relative clock drift needs to be known. In practice this means to send a packet in both directions between the transmitter unit and the speaker unit and from these packets acquire timestamps when they are sent and when they are received to calculate the transmission time.

Several problems exists to do this in a wireless system when the exact timestamp when a packet is sent or received is not available, and where the transmission time is neither constant nor the same for repeated transmissions. The sum of all these error sources will create both a very noisy and unpredictable measurements that will result in a very low accuracy of clock difference and clock drift.

In most, if not all, audio systems it is not even guaranteed to have the same transmission time depending on the direction a packet being sent, the audio system is in this sense asymmetrical. This means that there might be a difference in transmission time between a packet being sent to a speaker unit and a packet being sent back from the speaker unit, even without any external radio interference or internal system influences. Reasons for this can be for instance that different platforms being used for the transmitter and the speaker unit or the platforms are configured differently.

In some embodiments, the data packet to be transmitted also comprises time data for previous messages, which will be discussed in more detail below.

The data package also carries a first timestamp indicating a transmission time (TS1). The data package to be transmitted also comprises an indication for a reply to the transmitter. The indication may be prompt to reply to the transmitter. Alternatively or additionally the indication may be a time for when to reply to the transmitter. Alternatively or additionally the indication may be an identifier for which speaker unit that is to reply to the transmitter.

The indication may be explicit or it may be implicit. In one embodiment, the speaker unit 110 is configured to determine that it is the speaker unit to respond by determining a time difference between a data package and a next data package. If the speaker unit is the one transmitted to lastly for the first data package and lastly for the next data package, as is the case when it is time for the speaker unit to respond, the time difference will be at a minimum, very close to the wait time of the transmitter unit.

As for the method of FIG. 6, the transmitter then transmits 720 the audio data package using a same protocol for transmission and for synchronizing playback. The transmitter transmits the data package to each speaker unit. Depending on which type of indicator for a response that is being used, the data packages may be different in this aspect depending on which speaker unit the data package is transmitted to.

Also as for the method of FIG. 6, the speaker unit 110 receives 730 the data package and notes the time of reception by generating a second time stamp (TS2) indicating the reception time. And, the speaker unit causes the audio data to be played 740.

The speaker unit 110 also determines 750 whether a response to the transmitter is indicated in the received data package. This determination is based on the indication for a reply to the transmitter.

By including an indication for a reply to the transmitter the speaker units are caused to not all respond for each data packet received, but the transmitter can control which speaker unit is to reply and possibly when. By changing the order of which speaker unit is transmitted to first, the transmitter is enabled to transmit to the speaker unit indicated to respond last. This ensures that the transmitter unit will be free to receive a response from the speaker unit indicted to respond which reduces the risk of the response package being lost. The transmitter unit is thus also configured to transmit to the speaker units in order and to the speaker unit indicated to respond last. By changing the order, different speaker units may respond in different turns.

If it is indicated that a response is expected, the speaker unit 110 generates and transmits 755 a response message carrying a third timestamp (TS3) indicating the transmission time for the response message to the transmitter unit 100.

Meantime, the transmitter unit is waiting 760 a time period before generating and transmitting a next (series of) data packages to the speaker units 110. The time period that the transmitter unit waits indicates a frequency of transmission. This frequency of transmission is according to the teachings herein enabled to be held very high due to the small data package sizes. The wait period is in some embodiments in the range up to 10 ms. The wait period is in some such embodiments in the range 1 to 10 ms. The wait period is in some embodiments in the range 4 to 10 ms. The wait period is in some such embodiments in the range 6 to 8 ms. The wait period is in some such embodiments in the range 1 to 6 ms. The wait period is in some such embodiments in the range 1 to 4 ms.

While waiting the transmitter unit 100 receives 762 the response from the speaker unit 110 indicated to respond. The transmitter unit notes the time of reception and generates a fourth time stamp (TS4) indicating the reception time for the response message. The transmitter unit 110 also extracts the third tie stamp TS3 from the response message. The transmitter unit thus determines 764 time stamps for the response message.

The audio system thereafter determines 770 clock differences and clock drift based on the time stamps.

In some embodiments the determination of clock differences and clock drift is performed by the speaker unit 110. In such embodiments, the transmitter unit 100 is configured to include 766 the time stamps for the response message as time data for a next data package to be transmitted and to transmit to the speaker unit that last responded first when transmitting the next data package, wherein the next data package comprises the time stamps for the (previous) response message. As the speaker unit 110 receives this next data package, the speaker unit 110 will have the time stamps (TS1 and TS2) for the next data package as well as the time stamps (TS3 and TS4) for the previous response.

It should be noted that in such embodiments (where the speaker unit determines the clock difference and clock drift) the third time stamp need not be part of the response message and thus not be extracted by the transmitter unit and retransmitted back to the speaker unit, as the speaker unit 110 already has access to the third time stamp. The next data package thus carries the first time stamp (TS1) as well as the fourth time stamp (TS4).

It should also be noted that only the speaker unit receiving time data relevant to its own transmission is determining the clock difference and drift, as that is the only time stamps that the speaker unit can trust.

Even though it has been stated above that only one speaker unit at a time responds, it is also possible to implement a scheme where more than one speaker unit responds, whereby relevant time stamps are to be included in data packages according to which speaker units are responding and what unit (transmitter and/or speaker) that is determining the clock difference and drift.

In some embodiments the determination of clock differences and clock drift is performed by the transmitter unit 100. In such embodiments, the speaker unit 110 is configured to include the second time stamp (TS2) as well as the third time stamp (TS3) in the response message. This allows the transmitter unit 110 to have access to all four time stamps relevant to the indicated speaker unit.

As the clock difference and drift is determined by the transmitter unit, this information is transmitted to the speaker unit 110, possibly as part of the next data package, thus being the time data being transmitted in such embodiments.

As stated above, the audio system determines 770 clock differences and clock drift based on the time stamps. The clock differences and clock drift may—as stated above—be determined by the transmitter unit 110 and/or the speaker unit 110.

The clock differences and clock drift are determined based on the time stamps where

TS2−TS1=TRAVEL TIME+CLOCK DIFFERENCE

TS4−TS3=TRAVEL TIME−CLOCK DIFFERENCE

CLOCK DIFFERENCE being the difference between the clock of the transmitter unit and the clock of the speaker unit, i.e. the clock offset discussed in the above. The clock is assumed to be part of the controller 101 and 111 respectively. TRAVEL TIME is the time it takes for the data package to travel between speaker and transmitter.

This enables the clock difference to be determined as:

(TS2−TS1)−(TS4−TS3)=2×CLOCK DIFFERENCE

As the data transmission is repeated at high frequency (more than 100 times a second) even in relatively large speaker systems, each speaker unit will receive multiple determinations of the clock difference each second. For example, in a system with 4 speakers and transmitting every 5 ms, each speaker unit 110 will be able to determine 50 clock differences every second.

The clock drift will then be determined based on the changes of the clock difference over time. As the inventor has realized, it is not important to determine which clock gives rise to the drift, only to determine the cumulative effect of both clocks' drift. This is enabled by the teachings herein. The clock drift is thus the variation in clock offset discussed in the above.

The clock difference and/or the clock drift may then be used by the speaker unit 110 to provide a proper timing by adapting any time indications for playback for the audio data of the data packages, while causing playback of the audio data.

As the transmission frequency is high, this provides for a large collection of time stamps, which in turn provides for statistically accurate determinations of the clock difference and clock drift which provides for statistically accurate synchronizations. It should be noted that the high frequency of transmission is a key issue for the teachings herein.

By alternating the order in which the transmitter unit 110 transmits the audio packages to the speaker units it is ensured that all speaker units have or experience the same (or at least similar) errors in time stamps, as the error in time stamps depend on delays for sending the data packages which in turn depends on what order the package is transmitted in. Furthermore, embodiments where only the first speaker unit receiving packages determines the clock difference and drift carries further benefits in that only for the first receiving (or transmitted to) speaker unit's first and second timestamps are unaffected by queuing at the transmitter unit 110 and are thus more accurate.

The maximum size of a data package may be changed dynamically based on system performance.

The teachings herein avoid the very long filters and also long startup time before enough data has been acquired to get the required accuracy that will result from the more obvious solutions of collect data from multiple transmissions and use statistical calculations to improve the accuracy. A simplest form of this can be just to ignore values causing too much variation when performing a linear regression on the collected values.

The teachings herein also provide a manner to identify a type of interference. This is achieved by comparing time-stamps and/or transmission times for packets sent in close (in time) to one another in combination with knowledge of what could have caused a certain type of interference. By comparison of the retrieved values it is possible to guess the type of interference happened and then handle values differently depending on the estimated type. For instance in a WiFi network, it is well known how the back-off mechanism before sending a packet works to avoid packet collisions. Also packet aggregation is a well-known mechanism used by the transmitter if several packets have been queued and have the same speaker unit as destination.

To improve this comparison even more it is beneficial to take the expected clock drift between the two platforms into account when analyzing values from multiple measurements.

As the inventor has realized, this may be achieved by collecting as much data per time unit as possible, and thereby get faster startup time, which will also—as the inventor has realized—make it easier to categorize the type of interference and improve efficiency of the analyze of the collected data.

In some embodiments for providing an improved transmission (and playback) of audio the audio system 10 is configured to carefully control when packets are sent from the transmitter unit and from a speaker unit, this is specially true for a system aiming to send as many packets as possible per time unit. Foremost to avoid queuing of packets on the transmitter side if earlier packets for some reason has not yet been sent. But avoiding queued packets on the receiver is also useful for the receiving side depending on how time stamping for received packets are implemented on the platform.

In a system where one transmitter unit 100 is used to synchronize several speaker units 110 in parallel, the controlling of when the data packets are sent becomes even more important. For instance it is possible to let the transmitter unit decide when and which speaker unit is allowed to send a packet back to the transmitter unit to avoid speaker units to interfere with each other for the purpose of getting the most stable transmission time. On example of this is discussed above in relation to including the indicator for a response in the data package to be sent.

When transmitting and receiving a packet, the packet is processed by several 'layers' of hardware and software. Each layer handling different operations to make the modulated signal sent in the air to a CRC checked and acknowledged data packet presented to the user application.

Normally it is not possible to get timestamps exactly when a packet leaves or enters the antenna. Instead timestamps are often set either by hardware or software at a different layer and thereby the time stamp has an unknown and non-constant offset error since the time it takes to process the packet for some layers are not taken into account.

It might be possible to in some extent control where timestamps are taken, and also combine different timestamps to gain knowledge of processing time from different layers and thereby be able to compensate for this.

A better and more efficient solution is instead to ensure packets in both direction have as similar processing time as possible, foremost by using the same packet size. Many of the operations done at different layers are mostly affected by the packet size and by using the same packet size this error will be greatly reduced. This is the reason that the teachings herein propose to use the same data package size for all or at least most packages.

Another aspect that the inventor has realized and taken advantage of is to use the fact that latency and synchronization does not have the same requirement as explained in the chapter Audio latency and synchronization. It's is far more important to ensure synchronization and it is thereby possible to instead of trying to figure out the exact absolute time on all platforms, it is better to focus on getting all platforms to experience the same or at least similar error as discussed above and as provided a solution for above.

In a multi-speaker unit wireless system where one transmitter unit need to continuously send packets to several speaker units a way to accomplish this is to let the transmitter unit continuously alternate the order of what speaker unit to transmit to in combination with this let the transmitter unit indicate to the speaker units what order have been used. This is discussed in detail in the above with reference to FIG. 7 For instance, if the first packet to four speaker units are sent to speaker unit 1, 2, 3 and then 4, the next packet can be sent to speaker unit 4, 1, 2, 3.

It is likely that if sending packets with short time distance in between to several speaker units that at least some packets will be queued only for a short time, if only one packet can be sent at the time. By alternating the order of these packets all speaker units will experience similar average queue time and thereby get similar error when calculating the clock offset. If the speaker unit also knows something about this order it can use this to get the probability of a good accuracy of the belonging timestamp.

A simple example of this is to just let the speaker unit know if it is getting the first packet sent from the transmitter and only use measurements from this packet, since it is has least probability to have been queued on the transmitter side.

As the inventor has realized through substantive research the remaining relative error in a given system is typically a static error. So if knowing the exact time, or just selecting one platform as reference, it is possible to compensate for this error by simply adding a constant to the target latency and thereby align with another system with different or very small relative error.

A completely different way of using the fact that synchronization is more important than the latency is that it is possible to adjust the latency to become more optimal for the system. If, for some reason, packets to one speaker unit are being temporary delayed longer than expected, it is possible to let all speaker units adjust the latency to align their synchronization. Within certain limits, this can be done with almost no degrade of user experience. In such embodiments wherein the controller of the transmitter unit is further configured to include an indication of a change of delay for playing back the audio in the data package.

It should be noted that the embodiments discussed in relation to FIG. 7 are to be considered as being supplemental to the embodiments discussed in the above, for example in relation to FIG. 6, and all embodiments of FIG. 7 may be combined as appropriate with all embodiments previously disclosed and discussed.

Figure 8:
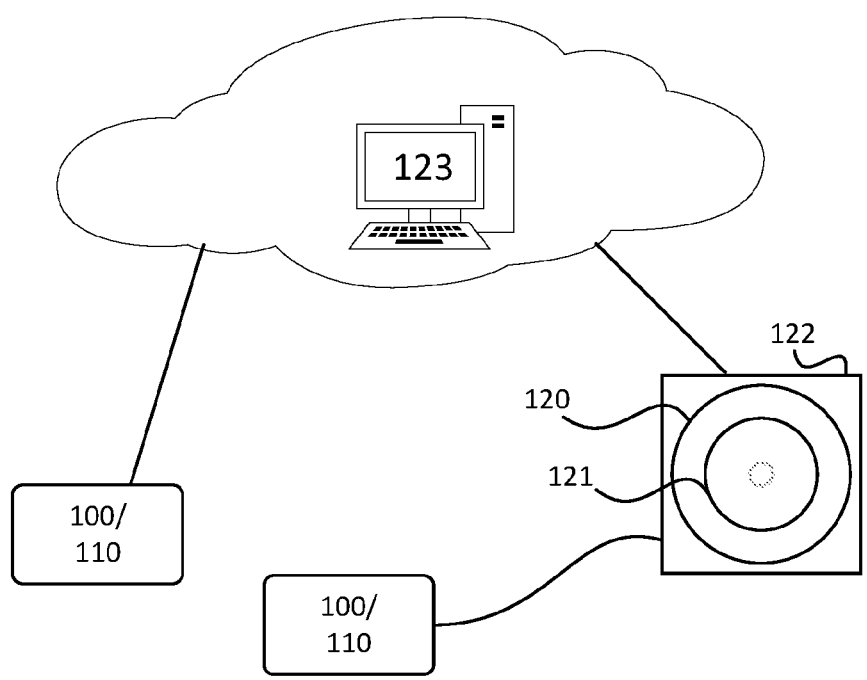
FIG. 8 shows a schematic view of a computer-readable medium carrying computer instructions that when loaded into and executed by a controller of an arrangement enables the arrangement to implement one embodiment of the teachings herein.

FIG. 8 shows a schematic view of a computer-readable medium 120 carrying computer instructions 121 that when loaded into and executed by a controller of a unit of an audio system 10 enables the unit of an audio system 10 to implement the present invention.

The computer-readable medium 120 may be tangible such as a hard drive or a flash memory, for example a USB memory stick or a cloud server. Alternatively, the computer-readable medium 120 may be intangible such as a signal carrying the computer instructions enabling the computer instructions to be downloaded through a network connection, such as an internet connection.

In the example of FIG. 8, a computer-readable medium 120 is shown as being a computer disc 120 carrying computer-readable computer instructions 121, being inserted in a computer disc reader 122. The computer disc reader 122 may be part of a cloud server 123—or other server—or the computer disc reader may be connected to a cloud server 123—or other server. The cloud server 123 may be part of the internet or at least connected to the internet. The cloud server 123 may alternatively be connected through a proprietary or dedicated connection. In one example embodiment, the computer instructions are stored at a remote server 123 and be downloaded to the memory 102 of the unit of an audio system 10 for being executed by the controller 101.

The computer disc reader 122 may also or alternatively be connected to (or possibly inserted into) a unit of an audio system 10 for transferring the computer-readable computer instructions 121 to a controller of the unit of an audio system 10 (presumably via a memory of the unit of an audio system 10).

FIG. 8 shows both the situation when a unit of an audio system 10 receives the computer-readable computer instructions 121 via a server connection and the situation when another unit of an audio system 10 receives the computer-readable computer instructions 121 through a wired interface. This enables for computer-readable computer instructions 121 being downloaded into a unit of an audio system 10 thereby enabling the unit of an audio system 10 to operate according to and implement the invention as disclosed herein.

The invention claimed is:

1. A transmission unit arranged to be used in an audio system comprising one or more speaker units, wherein the transmission unit comprises a controller and a wireless communication interface, wherein the controller is configured to:

transmit one or more audio data packages to be played back over the wireless communication interface utilizing the same protocol for the transmission of the one or more audio data packages and for synchronizing a playback of audio data; and schedule the transmission of the one or more audio data packages to optimize timestamps for the one or more audio data packages, wherein the controller is further configured to schedule the transmission of the one or more audio data packages to optimize the timestamps by transmitting the one or more audio data packages at a rate corresponding to a highest capability of the audio system, and/or by transmitting the one or more audio data packages at a rate of at least one audio data package every 10 ms.

2. The transmission unit of claim 1, wherein the controller is further configured to schedule the transmission of the one or more audio data packages to optimize the timestamps by transmitting the one or more audio data packages changing the order of which the one or more audio data packages is transmitted to the one or more speaker units, and/or by transmitting the one or more audio data packages changing the order of which the one or more speaker units is prompted to respond in.

3. The transmission unit of claim 1, wherein the controller is further configured to schedule the transmission of the one or more audio data packages to optimize the timestamps by transmitting the one or more audio data packages all at a same packet size.

4. A speaker unit arranged to be used in an audio system, wherein the speaker unit is configured to act as the transmission unit of claim 1.

5. An audio system comprising a transmission unit and a plurality of speaker units, wherein the transmission unit comprises a controller and a wireless communication interface arranged for communication, wherein the controller is configured to:
receive an audio data package to be played back; and
transmit the audio data package to be played back over the wireless communication interface utilizing same protocol for the transmission of the audio data package and for synchronizing a playback of audio data,
and wherein each of the plurality of the speaker units comprises a controller, a Pulse Code Modulation (PCM), a speaker element and a wireless communication interface arranged for communication, wherein the controller is configured to:
receive at least one data package to be played back through the wireless communication interface; and
cause audio represented by the received audio data package to be played back through the speaker element by feeding the audio data to the PCM being connected to the speaker element,
wherein the controller of the transmitter unit is further configured to
determine if a size of the received audio data package exceeds a maximum size, and if so
split up the received audio data package into the at least one data package to be transmitted each being of the maximum size; and to
transmit the audio data package to be played back by transmitting the at least one data package to be played back at a time interval, wherein the time interval does not exceed 10 ms, and wherein the controller of the speaker unit is further configured to
receive the audio data package by receiving the at least one data package to be played back through the wireless communication interface.

6. The audio system of claim 5, wherein the PCM comprises an internal buffer and wherein the speaker unit further comprises a receiving buffer for temporarily storing the received audio data before feeding the audio data to the PCM.

7. The audio system of claim 5, wherein the controller of the transmitter unit and/or the controller of the speaker unit are configured to:
receive a plurality of time stamps;
filter the received plurality of time stamps to determine a clock offset between the transmitter unit and the speaker unit to be used to determine when audio data should be played back through the speaker unit;
determine a variation of the clock offset per time unit; and
adjust a clock speed according to the determined variation of the clock offset.

8. The audio system of claim 7, wherein the controller of the transmitter unit is further configured to
filter the received plurality of time stamps to determine the clock offset by determining the clock offset based on differences between at least some of the plurality of timestamps.

9. The audio system of claim 8, wherein the controller of the receiver unit is further configured to
filter the received plurality of time stamps to determine the clock offset by determining the clock offset based on differences between at least some of the plurality of timestamps.

10. The audio system of claim 8, wherein the controller of the transmitter unit is further configured to
include at least some of the plurality of time stamps in the data package.

11. The audio system of claim 5, wherein the controller of the transmitter unit is further configured to transmit the audio data package to be played back to each of the plurality of speaker units in a first order and to transmit a next audio data package to be played back to each of the plurality of speaker units in a second order, wherein the first order is different from the second order.

12. The audio system of claim 11, wherein the controller of the transmitter unit is further configured to transmit the audio data package to be played back to a first speaker unit lastly in the first order and to transmit the next audio data package to be played back to the first speaker unit firstly in the second order.

13. The audio system of claim 12, wherein the controller of the transmitter unit is further configured to include an indication for a response in the audio data package to be played back that is transmitted to the first speaker unit.

14. The audio system of claim 5, wherein the controller of the transmitter unit is further configured to determine a type of interference based on timestamps for the data packages.

15. The audio system of claim 5, wherein the controller of the transmitter unit is further configured to include an indication of a change of delay for playing back the audio in the data package and/or
to include an indication of a change of delay for playing back the audio in the response data package.

16. The audio system of claim 5, wherein each audio data package is of a same size for one media file.

17. A method for an audio system comprising a transmission unit and a plurality of speaker units, wherein the transmission unit comprises a controller and a wireless communication interface arranged for communication, and wherein each of plurality of the speaker units comprises a controller, a Pulse Code Modulation (PCM), a speaker element and a wireless communication interface arranged for communication, wherein the method comprises, in the transmission unit:
receiving an audio data package to be played back; and
transmitting the audio data package to be played back over the wireless communication interface utilizing same protocol for the transmission of the audio data package and for synchronizing a playback of audio data,
and wherein the method further comprises, in at least one of the plurality of speaker units:
receiving at least one data package to be played back through the wireless communication interface; and
causing audio represented by the received audio data package to be played back through the speaker element by feeding the audio data to the PCM being connected to the speaker element,
wherein the method further comprises, in the transmission unit:
determining if a size of the received audio data package exceeds a maximum size, and if so
splitting up the received audio data package into the at least one data package to be transmitted each being of the maximum size; and to
transmitting the audio data package to be played back by transmitting the at least one data package to be played back at a time interval, wherein the time interval does not exceed 10 ms, and wherein the controller of the speaker unit is further configured to receiving the audio data package by receiving the at least one data package to be played back through the wireless communication interface.

18. A non-transitory computer-readable medium carrying computer instructions that when loaded into and executed by a controller of a unit of an audio system enables the unit of the audio system to implement the method of claim 17.

19. A transmission unit arranged to be used in an audio system comprising one or more speaker units, wherein the transmission unit comprises a controller and a wireless communication interface, wherein the controller is configured to:
- transmit one or more audio data packages to be played back over the wireless communication interface utilizing the same protocol for the transmission of the one or more audio data packages and for synchronizing a playback of audio data; and
- schedule the transmission of the one or more audio data packages to optimize timestamps for the one or more audio data packages, wherein the controller is further configured to:
- schedule and synchronize the transmission of the one or more audio data packages to optimize the timestamps by transmitting the one or more audio data packages all at a same packet size.

20. An audio system comprising a transmission unit and a plurality of speaker units, wherein the transmission unit comprises a controller and a wireless communication interface arranged for communication, wherein the controller is configured to:
- receive an audio data package to be played back; and
- transmit the audio data package to be played back over the wireless communication interface utilizing same protocol for the transmission of the audio data package and for synchronizing a playback of audio data, wherein each of the plurality of the speaker units comprises a controller, a Pulse Code Modulation (PCM), a speaker element and a wireless communication interface arranged for communication, wherein the controller is configured to:
- receive at least one data package to be played back through the wireless communication interface; and
- cause audio represented by the received audio data package to be played back through the speaker element by feeding the audio data to the PCM being connected to the speaker element, wherein each audio data package is of a same size for one media file.

* * * * *